(12) United States Patent
Sarrafi-Nour et al.

(10) Patent No.: US 8,647,767 B2
(45) Date of Patent: Feb. 11, 2014

(54) SODIUM-METAL-HALIDE ENERGY STORAGE DEVICE WITH SODIUM LEVEL CONTROL MECHANISM

(75) Inventors: Reza Sarrafi-Nour, Clifton Park, NY (US); Andrew Shapiro, Schenectady, NY (US); Chandra Sekher Yerramalli, Niskayuna, NY (US); Badri Narayan Ramamurthi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 698 days.

(21) Appl. No.: 12/729,297

(22) Filed: Mar. 23, 2010

(65) Prior Publication Data

US 2011/0236749 A1 Sep. 29, 2011

(51) Int. Cl.
*H01M 10/36* (2010.01)

(52) U.S. Cl.
USPC .............................................. 429/164; 429/61

(58) Field of Classification Search
USPC .................... 429/164, 61, 63, 72, 74
See application file for complete search history.

(56) References Cited

U.S. PATENT DOCUMENTS

| | | | |
|---|---|---|---|
| 4,132,820 A | 1/1979 | Mitoff | |
| 4,913,754 A | 4/1990 | Duncan et al. | |
| 5,279,908 A | 1/1994 | Bones et al. | |
| 6,419,875 B1 * | 7/2002 | Kitagawa et al. | 264/618 |
| 2003/0143440 A1 * | 7/2003 | Tao et al. | 429/13 |

OTHER PUBLICATIONS

Beta Power Inc., "Conceptual Design Study of High-Performance Sodium/Metal Chloride Batteries for Electric Vehicle Applications", Final Technical Report, Contract No. DE-AC02-89CH10406, Jul. 1990, National Technical Information Service, Springfield VA.

* cited by examiner

*Primary Examiner* — Mark F Huff
*Assistant Examiner* — Monique Wills
(74) *Attorney, Agent, or Firm* — Francis T. Coppa (57) ABSTRACT

An energy storage device includes a housing having an interior surface defining a volume and a plurality of solid electrolyte elements disposed in the volume. Each solid electrolyte element has a first surface that defines at least a portion of a first, cathodic chamber, and a second surface that defines a second, anodic chamber. A plurality of individual anode chambers are thus provided, a majority of which are in ionic communication with the cathode chamber through a majority of the solid electrolyte elements and which are also provided with a sodium level control mechanism.

17 Claims, 5 Drawing Sheets

SODIUM-METAL-HALIDE ENERGY STORAGE DEVICE WITH SODIUM LEVEL CONTROL MECHANISM

BACKGROUND

The invention relates generally to energy storage devices and systems, and more particularly to sodium-sulfur and sodium-metal-halide electrical energy storage devices and systems that exhibit an operational life and power density suitable for use in providing cost-effective and reliable electric energy storage solutions for electrical power grid renewable firming applications.

The greatest potential for significantly reducing green house gas emissions and reducing the US's petroleum consumption lies with the development and growth of renewable energy sources, such as wind and solar. To be optimally effective, a high penetration of these renewable energy sources into the electrical grid is necessary, as well as widespread electrification of the transportation systems. For either of these to occur, cost-effective and reliable electric energy storage solutions capable of delivering a wide range of power capabilities are needed.

When intermittent renewable power sources are connected to the grid, other power sources on the grid need to modulate their output in order to make up for the intermittency and ensure stable power output. The modulation service provided by these other sources is referred to as frequency regulation or renewable firming. At present, renewable firming is accomplished through the adjustment of output from excess conventional coal or gas power-generating units. However, as the renewable reaction of the grid power increases, an alternative non-green house gas emitting solution is desired. In particular, a cost-effective energy storage technology is required that can produce and absorb energy at the minutes to hours time scale and is scalable to the tens of megawatts power scale.

Desirably, a new energy storage technology would be provided that exhibits acceptable operational life so that the energy storage technology is suitable for use in renewable firming applications. The new energy storage technology will desirably provide a power density capability to provide an acceptable installed power cost. Any such technology will also desirably be capable of robust operation, i.e., not be susceptible to sodium overcharging and resultant cell failure.

BRIEF DESCRIPTION

In one embodiment, a sodium-metal-halide energy storage device includes a housing having an interior surface defining a volume; a plurality of solid electrolyte elements disposed in the volume, each solid electrolyte element having a first surface that defines at least a portion of a first, cathodic chamber, and a second surface that defines a second, anodic chamber so that a plurality of individual anodic chambers are provided. Each anodic chamber is in ionic communication with the cathodic chamber through a corresponding solid electrolyte element. A majority of the anodic chambers are provided with a sodium level control mechanism.

According to another embodiment, a sodium-metal-halide energy storage device includes a housing having an interior surface defining a volume; a plurality of solid electrolyte elements disposed in the volume, each solid electrolyte element having a first surface that defines at least a portion of a first, cathodic chamber, and a second surface that defines a second, anodic chamber so that a plurality of individual anodic chambers are provided. The cathodic chamber is partitioned such that each anodic chamber is in ionic communication with a substantially identical maximum amount of cathode material through a corresponding solid electrolyte element.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity).

Figure 1:
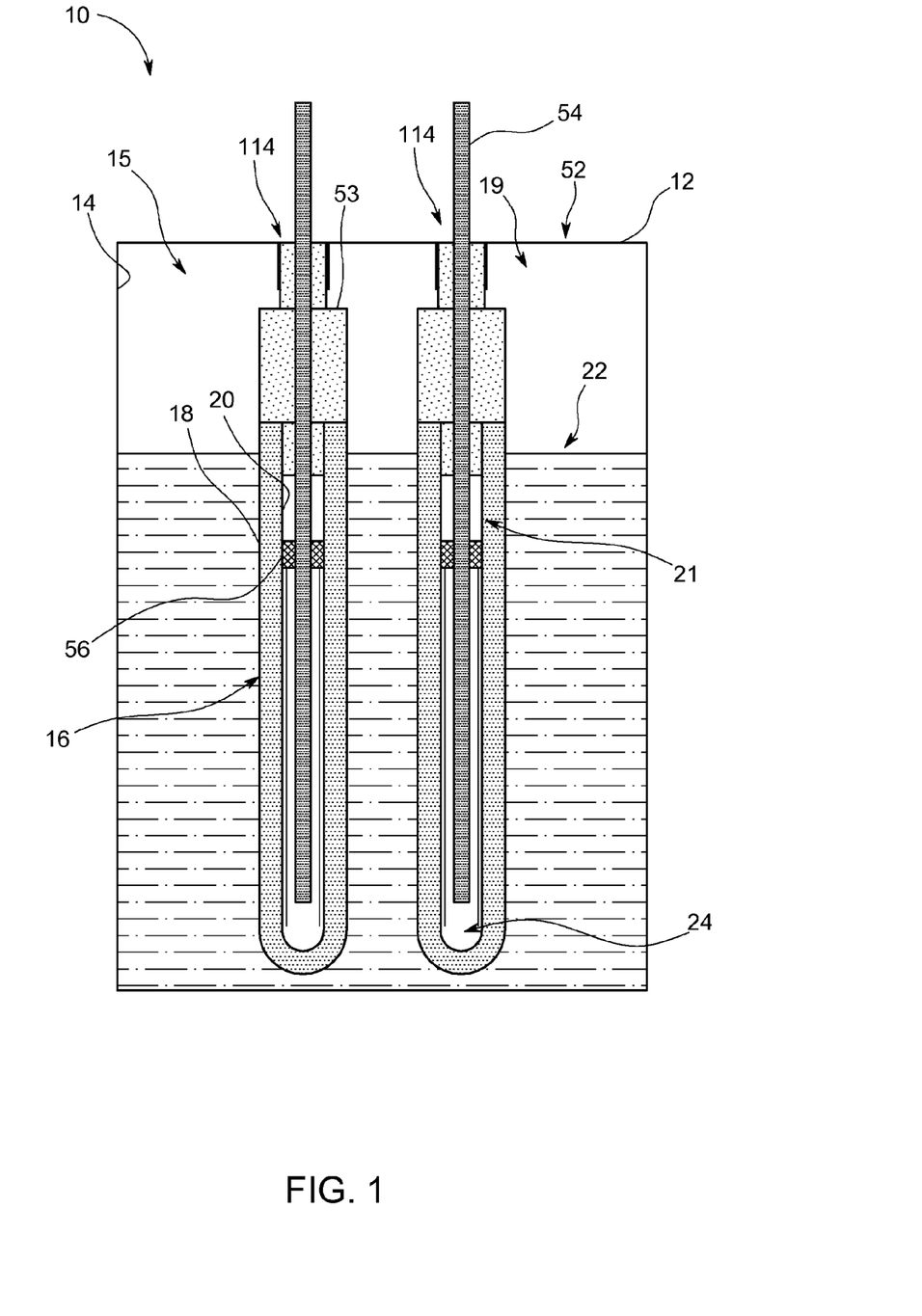
FIG. 1 is a cross sectional view of sodium-metal-halide energy storage device according to one embodiment of the invention.

Looking now at FIG. 1, a cross sectional view of sodium-metal-halide energy storage device 10 is illustrated according to one embodiment of the invention. Energy storage device 10 includes a housing 12 having an interior surface 14 defining a volume 19 and a plurality of solid electrolyte elements 16 disposed in the volume 19. Each solid electrolyte element 16 has a first surface 18 that defines at least a portion of a first, cathode chamber 15, and a second surface 20 that defines a second, anode chamber 21 so that a plurality of anode chambers 21 are also provided. In some embodiments, at least two, or three, or four, or five, etc., anode chambers 21 are provided.

At least a majority of, and in some embodiments, substantially all, of the anode chambers 21 are in ionic communication with the cathode chamber 15 through corresponding solid electrolyte elements 16. In particular embodiments, a majority of the anode chambers 21 are provided with a sodium level control mechanism such as one or more of those described in further detail herein with reference to FIGS. 2-4. Another embodiment comprises a cathode structure described in further detail herein with reference to FIGS. 5 and 6, in which a cathode 22 is partitioned such that each anodic chamber 21 is in ionic communication with a substantially identical limited maximum amount of cathode material 22 through its corresponding solid electrolyte element 16.

Due at least in part to the use of a common cathode 22, external to a plurality of anode chambers 21, the embodied sodium-metal-halide energy storage devices 10 are expected to exhibit power densities of up to five times greater than conventional energy storage devices, and in particular, conventional sodium-sulfur and conventional sodium-metal-halide energy storage devices.

Energy storage device 10 can be seen to include a plurality of feedthrough current collectors 114, each feedthrough current collector 114 comprising an anode current collector 54 attached to a ceramic insulator 53 and a shim assembly 56. Each anode current collector 54 is in electrical communication with a corresponding anode chamber 21 while a cathode current collector 52 is in electrical communication with the contents of the cathode chamber 15.

More particularly, the ability of an energy storage device to deliver power is inversely proportional to its internal resistance. This internal resistance, in turn, is made up of ohmic and non-ohmic components. Ohmic resistance is largely dependent upon surface area of the solid electrolyte separator 16 that may comprise a beta alumina solid electrolyte (BASE), its thickness, and the thickness of the cathode 22. The multi-anode 21, common cathode 22 architecture embodiments described herein, address this issue geometrically by ensuring a high BASE surface area relative to the total cathode volume 19.

Figure 2:
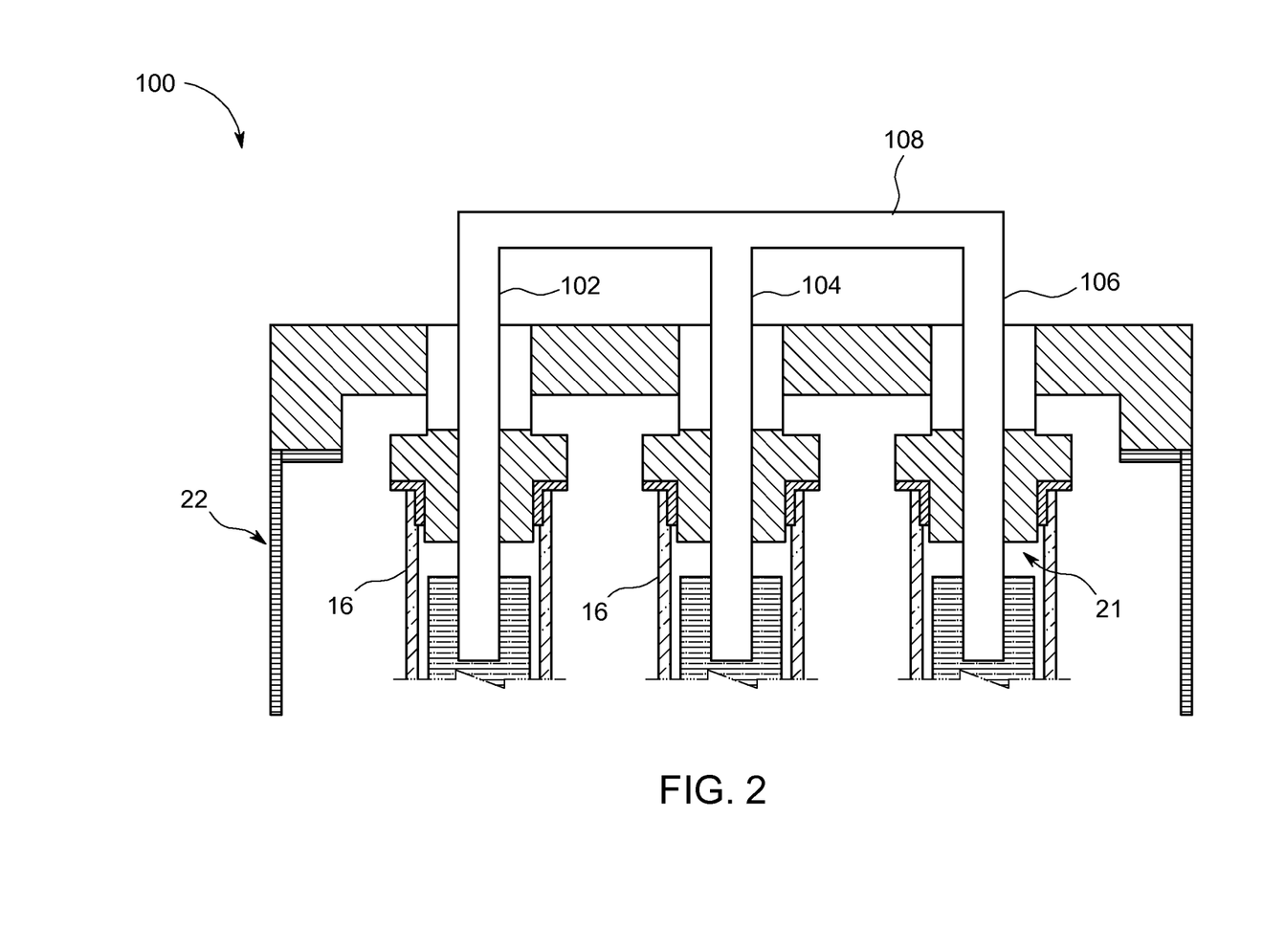
FIG. 2 is a cross sectional view illustrating a common hollow electrode suitable for use with the sodium-metal-halide energy storage device depicted in FIG. 1 according to one embodiment.
Figure 3:
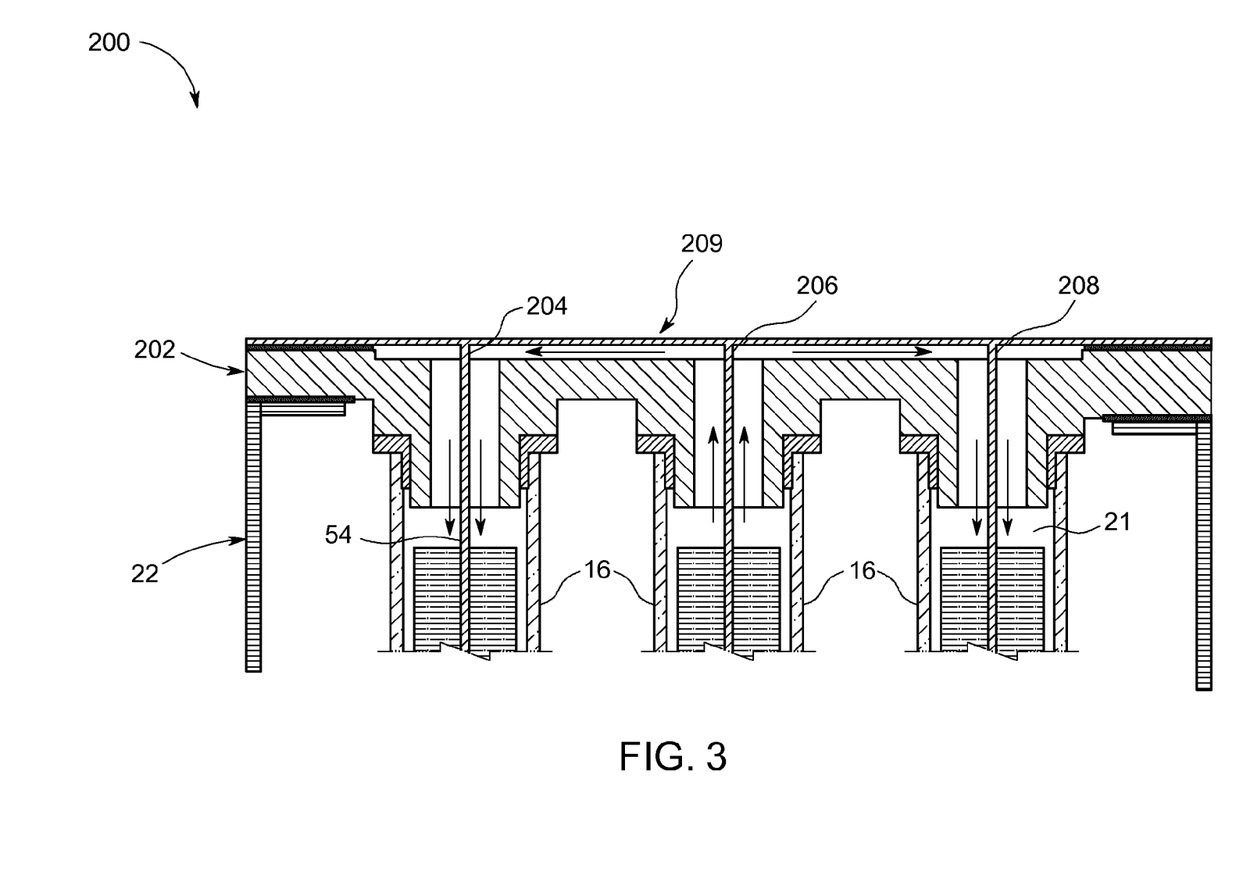
FIG. 3 is a cross sectional view illustrating a common header manifold suitable for use with the sodium-metal-halide energy storage device depicted in FIG. 1 according to one embodiment.
Figure 4:
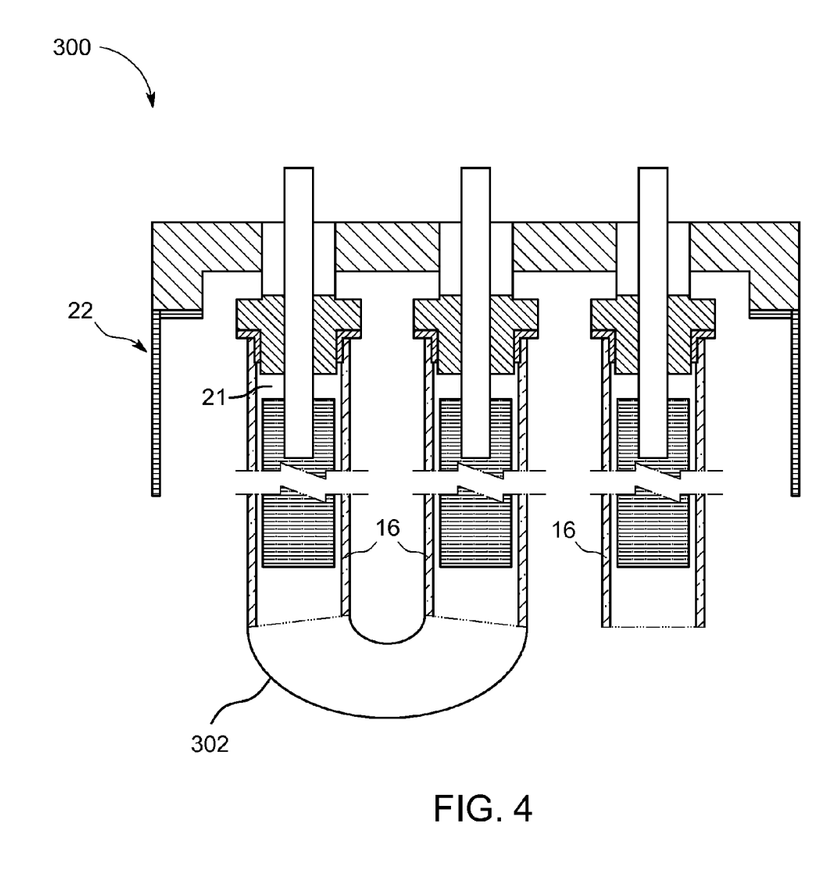
FIG. 4 is a cross sectional view illustrating a common base footer suitable for use with the sodium-metal-halide energy storage device depicted in FIG. 1 according to one embodiment.

Some embodiments described herein with reference to FIGS. 2-4 additionally provide a mechanism for sodium level control operatively disposed in connection with a majority of the anode chambers 21 as stated above. As a result, the risk of overcharging or overfilling the anode chambers 21 with sodium can be reduced, or even substantially eliminated. The risk of failure of the chamber(s) 21, and the device 10 as a whole, is thus also reduced.

FIG. 2 is a cross sectional view illustrating a common hollow electrode structure 100 suitable for use with the energy storage device 10 depicted in FIG. 1 according to one embodiment. Common hollow electrode structure 100 provides a sodium level control mechanism comprising a plurality of hollow metal tubes 102, 104, 106 as the current collector in each anode chamber 21. These hollow metal tubes 102-106 can be manifolded together at the top of the device 10 through a common header 108. In such an arrangement, if any anode chamber 21 becomes overcharged, the excess sodium can flow into the less charged tubes through the manifolded network of hollow current collectors. The manifold 108, or common header, can be made of metal such as, without limitation, (Steel, nickel, molybdenum) and serve to electrically connect the anode tubes 16. In one embodiment the common header 108 is designed such that upon the initial charge, the manifold 108 and hollow metal tubes 102-106 fill with molten sodium, connecting the sodium fluid in each tube. In this embodiment, the sodium is self-leveling as hydrostatic forces will drive the sodium level to be equal in all tubes.

FIG. 3 is a cross sectional view illustrating a common header manifold structure 200 suitable for use with the energy storage device 10 depicted in FIG. 1 according to one embodiment. The solid electrolyte elements (anode tubes) 16 are connected to a ceramic manifold 202 which may be glass-sealed to the anode tubes 16. The ceramic may comprise alpha-alumina, a non-ion-conducting material. In this embodiment, current conducting rods 204, 206, 208 pass through the ceramic manifold 202 to connect the metal current collector 54 within the anode tubes 16 to the common anode terminal 209 of the cell 200 on the exterior of the ceramic manifold 202. In such an arrangement, if any anode chamber 21 becomes overcharged, the excess sodium can flow into the less charged tubes 16 through the common header manifold 202.

FIG. 4 is a cross sectional view illustrating a common base footer structure 300 suitable for use with the energy storage device 10 depicted in FIG. 1 according to one embodiment. A plurality of solid electrolyte elements configured as anode tubes 16 are interconnected at the base of the anode tubes 16 via one or more base u-tubes 302. In such an arrangement, if any anode chamber 21 becomes overcharged, the excess sodium can flow into a less charged tube 16 that is interconnected to the overcharged chamber via a corresponding base u-tube 302.

In other embodiments, sodium level may be controlled by partitioning the common cathode 22 so that only a predetermined amount of cathode material can be accessed by each tube 16. By properly sizing the available cathode material with the internal volume of the anode tube 16, overcharging the anode can be prevented.

Figure 5:
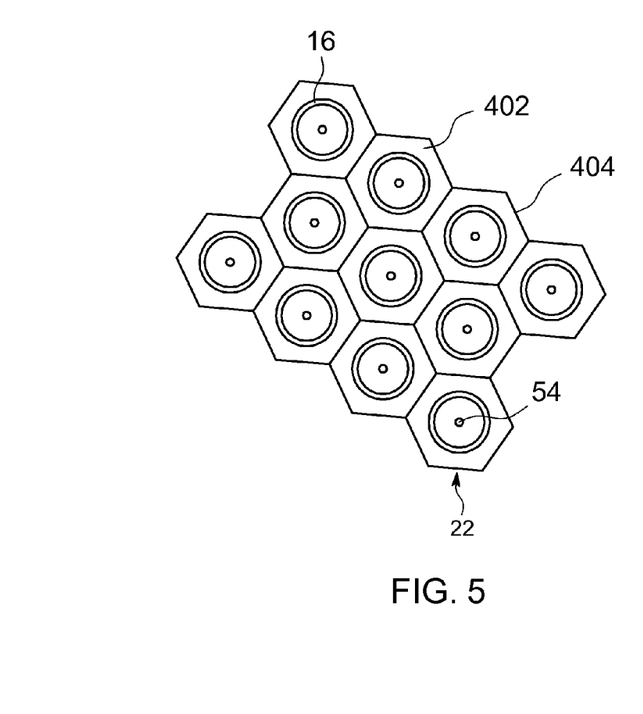
FIG. 5 is a top view of a partitioned anode tube structure suitable for use with the sodium-metal-halide energy storage device depicted in FIG. 1 according to one embodiment.

FIG. 5 is a top view of a partitioned anode tube structure 400 suitable for use with the energy storage device 10 depicted in FIG. 1 according to one embodiment.

Figure 6:
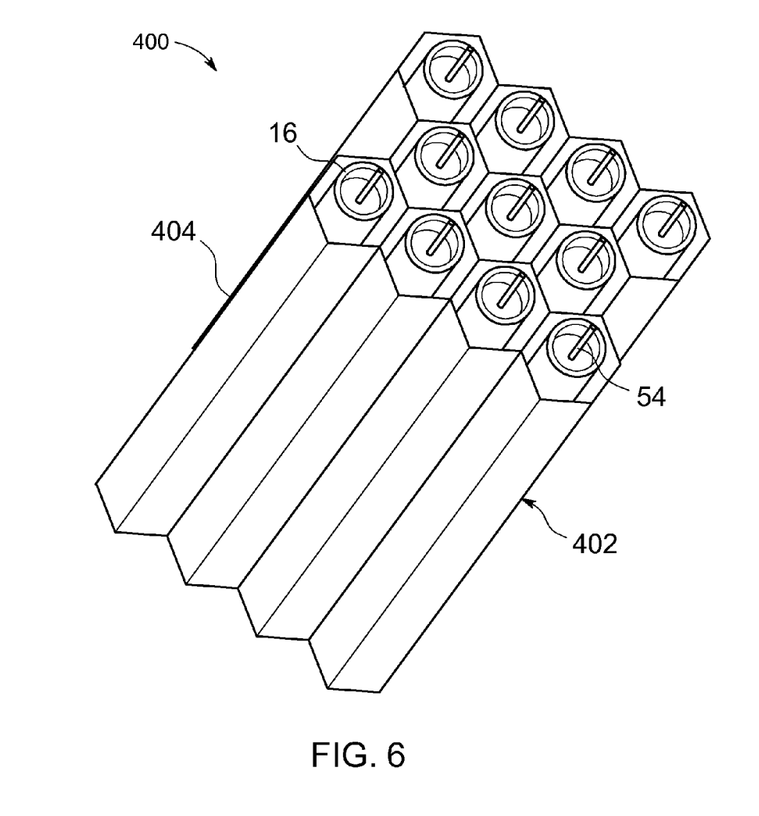
FIG. 6 is a perspective view of the partitioned anode tube structure depicted in FIG. 5 according to one embodiment.

FIG. 6 is a perspective view of the partitioned anode tube structure 400 depicted in FIG. 5 according to one embodiment. In this embodiment, the anode tubes 16 are disposed within a honeycomb or grid pattern cathode structure and are located at the center of cathode cells 402 defined by the appropriate sized honeycomb or rectangular grid partitions 404. The grid partitions 404 can be made from, without limitation, metal compatible with the cathode composition (for example, iron, steel, nickel, molybdenum, titanium, and/or combinations thereof.

The grid partitions 404 operate to prevent each anode tube 16 from interfacing with a volume of the cathode material 22 that is beyond the share of cathode material 22 it should receive under equal anode tube operating conditions. Thus, partitioning limits the amount of cathode material 22 that is available to each anode tube 16. Since for example, liquid electrolyte that carries sodium ions in the cathode material 22 has access to every portion of a non-partitioned cathode, regents away from a particular anode tube 16 can still supply cathode material 22 to that anode tube 16 subsequent to consuming a portion of the cathode material 22 adjacent to that non-partitioned anode tube 16 if the anode tube remain active.

Other embodiments may include cathode grid partitions 404 arranged in patterns other than honeycomb or grid structures. Grid partitions 404 can be arranged for example, to have any if numerous shapes and sizes so long as the grid partitions operate to achieve the desired uniform reaction rate throughout the cathode chamber 15.

According to some embodiments, the cathodic material 22 comprises, for example, one or more cathodic materials, that may exist in elemental form and/or as a salt depending on a state of charge; and the ratio of the weight percent of the cathodic material in elemental form to the weight percent of the salt form may be based on the state of charge.

A sulfur or a phosphorous containing additive may be disposed in the cathodic material. The presence of sulfur or phosphorous in the cathode prevents recrystallization of salts and grain growth. For example, elemental sulfur, sodium sulfide or triphenyl sulfide may be disposed in the cathode.

Salts of the anodic material may be metal halides. Suitable halides may include chloride. Alternately, the halide may include bromide, iodide or fluoride. In one embodiment, the halide may include chloride, and one or more additional halides. Suitable additional halide may include iodide or fluoride. In one embodiment, the additional halides are sodium iodide or sodium fluoride. The amount of additional halide may be greater than about 0.1 weight percent. In some embodiments, the amount is in range of from about 0.1 weight percent to about 0.5 weight percent, from about 0.5 weight percent to about 1 weight percent, from about 1 weight percent to about 5 weight percent, from about 5 weight percent to about 10 weight percent.

In one embodiment, the anode chamber 21 may contain an anodic material that may function as an anode. A suitable material for the anodic material supplying the transportion is a Group I metal, such as sodium. Other suitable anodic material may include one or both of lithium and potassium, and which may be used alternatively or additively with sodium. The anodic material may be molten during use.

Additives suitable for use in the anodic material may include a metal oxygen scavenger. Suitable metal oxygen scavengers may include one or more of manganese, vanadium, zirconium, aluminum, or titanium. Other useful additives may include materials that increase wetting of the separator surface by the molten anodic material. Additionally, some additives may enhance the contact or wetting of the BASE 16 with regard to the current collector 54, to ensure substantially uniform current flow throughout the solid electrolyte (BASE) 16.

Suitable operating temperature for the energy storage device 10 may be greater than about 150 degrees Celsius and may be selected based on components and performance requirements. In some embodiments, the operating temperature is in a range of from about 150 degrees Celsius to about 200 degrees Celsius, from about 200 degrees Celsius to about 250 degrees Celsius, from about 250 degrees Celsius to about 300 degrees Celsius, from about 300 degrees Celsius to about 350 degrees Celsius, from about 350 degrees Celsius to about 400 degrees Celsius, from about 400 degrees Celsius to about 450 degrees Celsius, from about 450 degrees Celsius to about 500 degrees Celsius, or from about 550 degrees Celsius to about 600 degrees Celsius.

The housing 12 according to some embodiments can be sized and shaped to have a cross-sectional profile that is square, polygonal, or circular; and can have a width to length ratio that is greater than about 1:10. In some embodiments, the length to width ratio is in a range of from about 1:10 to about 1:5, from about 1:5 to about 1:1, from about 1:1 to about 5:1, from about 5:1 to about 10:1, from about 10:1 to about 15:1. The housing 12 can be formed from a material that is a metal, ceramic, or a composite; the metal can be selected from nickel or steel, the ceramic can be a metal oxide.

As noted above, the solid electrolyte 16 is disposed within the volume of the housing 12. The solid electrolyte 16 may have a cross-sectional profile normal to the axis that is without limitation a circle, a triangle, a square, a cross, or a star. Alternatively, the solid electrolyte 16 can be substantially planar. A planar configuration (or with a slight dome) may be useful in a prismatic or button-type battery configuration, where the solid electrolyte is domed or dimpled. Similarly, the solid electrolyte can be flat or undulate.

The solid electrolyte 16 may be an alkali metal ion conductor solid electrolyte that conducts alkali metal ions during use. Suitable materials for the solid electrolyte 16 may include an alkali-metal-beta'-alumina, alkali-metal-beta"-alumina, alkali-metal-beta'-gallate, or alkali-metal-beta"-gallate. In one embodiment, the solid electrolyte comprises a beta alumina. In one embodiment, a portion of the solid electrolyte 16 is alpha alumina and another portion of the solid electrolyte 16 is beta alumina. The alpha alumina may be relatively more amenable to bonding (e.g., compression bonding) than beta alumina, and may help with sealing and/or fabrication of the energy storage device 10.

The solid electrolyte 16 may be stabilized by the addition of small amounts of, but not limited to lithia, magnesia, zinc oxide, yttria or similar oxides. These stabilizers may be used alone or in combination with themselves or with other materials. The solid electrolyte 16, sometimes referred to as beta alumina solid electrolyte (BASE) may include one or more dopant. Suitable dopants may include oxide of a transition metal selected from iron, nickel, copper, chromium, manganese, cobalt, or molybdenum. A BASE 16 having the dopants is referred to as beta"alumina solid electrolyte, and has higher sodium ion conductivity than beta alumina. Sodium ion conductivity of one form of beta" alumina solid electrolyte at 300 degrees Celsius is in a range of from about 0.2 ohm$^{-1}$ cm$^{-1}$ to about 0.4 ohm$^{-1}$ cm$^{-1}$.

The amount of the stabilizer added to the beta" alumina can be greater than 0.5 weight percent. In some embodiments, the amount is in a range of from about 0.5 weight percent to about 1 weight percent, from about 1 weight percent to about 2 weight percent, from about 2 weight percent to about 3 weight percent, from about 3 weight percent to about 4 weight percent, from about 4 weight percent to about 5 weight percent, from about 5 weight percent to about 10 weight percent, from about 10 weight percent to about 15 weight percent, from about 15 weight percent to about 20 weight percent, or greater than about 20 weight percent based on the total weight of the beta" alumina material.

The solid electrolyte 16 can be a tubular container in one embodiment having at least one wall. The wall can have a thickness; and an ionic conductivity and the resistance across the wall may depend in part on the thickness. Suitable thickness can be less than 5 millimeters. In some embodiments, the thickness is in a range of from about 5 millimeters to about 4 millimeters, from about 4 millimeters to about 3 millimeters, from about 3 millimeters to about 2 millimeters, from about 2 millimeters to about 1.5 millimeters, from about 1.5 millimeters to about 1.25 millimeters, from about 1.25 millimeters to about 1.1 millimeters, from about 1.1 millimeters to about 1 millimeter, from about 1 millimeter to about 0.75 millimeters, from about 0.75 millimeters to about 0.6 millimeters, from about 0.6 millimeters to about 0.5 millimeters, from about 0.5 millimeters to about 0.4 millimeters, from about 0.4 millimeters to about 0.3 millimeters, or less than about 0.3 millimeters.

A cation facilitator material can be disposed on at least one surface of the solid electrolyte 16, in one embodiment. The cation facilitator material may include, for example, selenium. At least one solid electrolyte 16 surface has a surface roughness RMS in a range of greater than about 10 nanometers. In some embodiments, the surface roughness (RMS) is in range of from about 10 nanometers to about 20 nanometers, from about 20 nanometers to about 30 nanometers, from about 30 nanometers to about 40 nanometers, from about 40 nanometers to about 50 nanometers, from about 50 nanometers to about 60 nanometers, from about 60 nanometers to about 70 nanometers, from about 70 nanometers to about 80 nanometers, from about 80 nanometers to about 90 nanometers, or from about 90 nanometers to about 100 nanometers.

The solid electrolyte 16 can seal to an inner surface of the housing 12 by a sealing structure. The sealing structure can be of a glassy composition. The sealing structure is operable to maintain a seal between the contents and the environment at a temperature greater than about 100 degrees Celsius. In some embodiments, the operating temperature range is from about 100 degrees Celsius to about 200 degrees Celsius, from about 200 degrees Celsius to about 300 degrees Celsius, from about 300 degrees Celsius to 400 degrees Celsius, from about 400 degrees Celsius to about 500 degrees Celsius, or from about 500 degrees Celsius to about 600 degrees Celsius.

Suitable glassy sealing compositions may include, but are not limited to phosphates, silicates, borates, germinates, vanadates, zirconates, arsenates, and their various forms, for example, borosilicates, alumino silicate, calcium silicate, binary alkali silicates, alkali borates, or a combination of two or more thereof. Alternatively, the end portions of the solid electrolyte 16 may include alpha alumina. The alpha alumina can be bonded directly to the lid that encloses the cathode chamber 15. Suitable bonding methods may include thermal compression bonding, diffusion bonding, or thin film metallizing, each of these may be used in conjunction with welding or brazing techniques.

The solid electrolyte can be formed as a toughened ceramic, and can be formed with various modifiers that affect physical strength, vibration/shock resistance, ionic conductivity/resistance, and copper ion infiltration. To reduce a pressure differential across the BASE 16, the negative pressure generally caused on the cathode side by the migration of ions to the anode may be balanced by reducing the initial pressure on the anode side to less than ambient. The anode side may be sealed under vacuum, or a vacuum may be formed after sealing by reacting a consumable gas (oxygen) in the anode chamber 21 with the incoming ions (e.g., sodium to solid sodium oxide) during initial usage.

The energy storage device 10 may have a plurality of current collectors including anode current collectors 54 and cathode current collectors 52. In some embodiments, described above with reference to FIGS. 2-4, the current collectors may be in the form of hollow tubes, in order to assist in the prevention of overfilling or overcharging the anode chambers 21 with sodium. The anode current collector 54 is in electrical communication with the anode chamber 21 and the cathode current collector 52 is in electrical communication with the contents of the cathode chamber 15. The current collector may include an electrically conductive material. Suitable materials for the anode current collector 54 may include W, Ti, Ni, Cu, Mo or combinations of two or more thereof. Other suitable materials for the anode current collector 54 may include carbon. The cathode current collector 52 may be a wire, paddle or mesh formed from Pt, Pd, Au, Ni, Cu, C, or Ti. Alternatively, the cathode current collector 52 may be at least a portion of the device housing 12 that may comprise steel. The cathode current collector may be plated or clad. Cladding on the current collector, if present, may coat the current collector to a thickness greater than about 1 μm. In some embodiments, the cladding thickness is in a range of from about 1 micrometer (μm) to about 10 μm, from about 10 μm to about 20 μm, from about 20 μm to about 30 μm, from about 30 μm to about 40 μm, or from about 40 μm to about to about 50 μm.

The plurality of cathode current collectors 52 can have thickness greater than 1 millimeter (mm). In some embodiments, the thickness is in a range of from about 1 millimeter to about 10 millimeters, from about 10 millimeters to about 20 millimeters, from about 20 millimeters to about 30 millimeters, from about 30 millimeters to about 40 millimeters, or from about 40 millimeters to about to about 50 millimeters.

In those embodiments where the anode current collectors 54 are hollow, some embodiments may have without limitation an inner diameter in a range of from about 0.1 millimeters to about 0.5 millimeters, from about 5 millimeters to about 1 millimeter, from about 1 millimeter to about 2 millimeters, from about 2 millimeters to about 3 millimeters, or from about 3 millimeters to about 5 millimeters.

The device 10 may be assembled in the discharged state. Applying a voltage between one or more of the anodes 114 and the cathode 22 of the electrochemical cell may charge the device 10. In one embodiment, sodium chloride in the cathode 22 dissolves to form sodium ions and chloride ions during charging. Sodium ions, under the influence of applied electrical potential, conduct through the solid electrolyte 16 and combine with electrons from an external circuit to form the sodium electrode and chloride ions that react with the cathodic material to form metal chloride and donate electrons back to external circuit. During discharge, sodium ions conduct back through the solid electrolyte (BASE) 16 reversing the reaction, and generating electrons. The device reaction is as follows:

$$nNaCl + M \leftrightarrow MCl_n + nNa^+ + ne^-$$

While only certain features and embodiments have been illustrated and described herein, many modifications and changes may occur to one of ordinary skill in the relevant art. Thus, it is intended that the scope of the invention disclosed should not be limited by the particular disclosed embodiments described above, but should be determined only by a fair reading of the claims that follow.

What is claimed is:

1. A sodium-metal-halide energy storage device comprising:
   a housing having an interior surface defining a volume; and
   a plurality of solid electrolyte elements disposed within the volume, each solid electrolyte element having a first surface that defines at least a portion of a first cathodic chamber, and a second surface that defines a plurality of second, anodic chambers;
   wherein a majority of the anodic chambers are in ionic communication with the cathodic chamber through a majority of the solid electrolyte elements, and are provided with a sodium level control mechanism; and
   wherein the sodium level control mechanism is configured to transfer excess anodic material from an overcharged anodic chamber into a lesser-charged anodic chamber.

2. The energy storage device of claim 1, wherein the anodic chambers comprise a Beta alumina secondary electrolyte.

3. The energy storage device of claim 1, wherein the sodium level control mechanism comprises a manifold assembly configured to provide fluid communication of anodic material from at least one anodic chamber to at least one different anodic chamber.

4. The energy storage device of claim 3, wherein the manifold assembly comprises a plurality of hollow current collectors configured to provide the fluid communication of anodic material through a common header.

5. The energy storage device of claim 3, further comprising a plurality of anodic chamber electrical current conducting rods passing through the manifold assembly and connected to a common anode terminal.

6. The energy storage device of claim 1, wherein the sodium level control mechanism comprises a common base footer assembly configured to provide fluid communication of anodic material from at least one anodic chamber to at least one different anodic chamber.

7. The energy storage device of claim 6, wherein the common base footer assembly comprises one or more hollow tubes configured to provide the fluid communication of anodic material through the one or more hollow tubes.

8. The energy storage device of claim 1, wherein the sodium level control mechanism comprises a partitioned anode tube structure.

9. The energy storage device of claim 8, wherein the partitioned anode tube structure comprises a plurality of cathode partitions configured to control the amount of cathodic material available to each partitioned anode tube.

10. The energy storage device of claim 9, wherein the plurality of cathode partitions is configured to prevent overcharging of one or more anode tubes.

11. The energy storage device of claim 9, wherein each partitioned anode tube is substantially centrally disposed within a plurality of corresponding cathode partitions.

12. The energy storage device of claim 9, wherein the plurality of cathode partitions is arranged in a honeycomb pattern.

13. The energy storage device of claim 9, wherein the plurality of cathode partitions is arranged in a grid pattern.

14. The energy storage device of claim 9, wherein the plurality of cathode partitions is configured in combination with the partitioned anode tubes to provide a desired uniform reaction rate throughout the cathodic chamber.

15. A sodium-metal-halide energy storage device comprising:
a housing having an interior surface defining a volume; and
a plurality of solid electrolyte elements disposed within the volume, each solid electrolyte element having a first surface that defines at least a portion of a first, cathodic chamber, and a second surface that defines a plurality of second, anodic chambers;
wherein a majority of the anodic chambers are in ionic communication with the cathodic chamber through a majority of the solid electrolyte elements, and are partitioned to control the amount of sodium available to each partitioned anodic chamber;
wherein the partitioned anodic chambers are configured to prevent overcharging of one or more anode tubes, each anode tube being substantially centrally disposed within a plurality of corresponding cathode partitions; and
wherein the plurality of cathode partitions is arranged in a grid pattern or a honeycomb pattern.

16. The energy storage device of claim 15, wherein the plurality of cathode partitions is configured in combination with the partitioned anode tubes to provide a desired uniform reaction rate throughout the cathodic chamber.

17. The energy storage device of claim 1, wherein a plurality of the anodic chambers share a common cathode.

* * * * *